(12) United States Patent  (10) Patent No.: US 9,525,844 B2
Kim  (45) Date of Patent: *Dec. 20, 2016

(54) MOBILE TERMINAL AND METHOD FOR TRANSMITTING IMAGE THEREIN

(71) Applicant: Samsung Electronics Co., Ltd., Suwon-si, Gyeonggi-do (KR)

(72) Inventor: Kyung Min Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,837

(22) Filed: Jul. 24, 2014

(65) Prior Publication Data

US 2014/0333714 A1     Nov. 13, 2014

Related U.S. Application Data

(63) Continuation of application No. 12/243,581, filed on Oct. 1, 2008, now Pat. No. 8,823,766.

(30) Foreign Application Priority Data

Oct. 26, 2007 (KR) .................. 10-2007-0108284

(51) Int. Cl.
    *H04N 7/14*           (2006.01)
    *H04N 1/00*           (2006.01)
    *H04N 1/32*           (2006.01)

(52) U.S. Cl.
    CPC .......... *H04N 7/142* (2013.01); *H04N 1/00299* (2013.01); *H04N 1/32101* (2013.01);
(Continued)

(58) Field of Classification Search
    CPC ................................ H04N 7/141; H04N 7/142
(Continued)

(56) References Cited

U.S. PATENT DOCUMENTS 6,313,863 B1    11/2001   Chida
8,049,678 B2    11/2011   Lee et al.
(Continued)

FOREIGN PATENT DOCUMENTS

JP      1996-046973 A     2/1996
JP      2003-274376 A     9/2003
(Continued)

*Primary Examiner* — Nam Huynh
(74) *Attorney, Agent, or Firm* — Jefferson IP Law, LLP

(57) ABSTRACT

A mobile terminal and a method for transmitting an image therein are provided. The method includes displaying a first image input through a first camera unit while participating in a video communication, transmitting the first image to a counterpart terminal, operating, if a second image is selected for transmission, a second camera unit, inputting a second image through the second camera unit, resizing the first image and the second image according to an image standard used for the video communication, displaying the resized first image and second image, and transmitting the resized first image and second image to the counterpart terminal. Thus, a user can view images for video communication input through more than one camera unit and transmit the images to a counterpart terminal during a video communication.

19 Claims, 4 Drawing Sheets

(52) U.S. Cl.
CPC ......... *H04N 7/147* (2013.01); *H04N 1/00283* (2013.01); *H04N 2007/145* (2013.01); *H04N 2201/0084* (2013.01); *H04N 2201/3267* (2013.01); *H04N 2201/3273* (2013.01); *H04N 2201/3278* (2013.01)

(58) Field of Classification Search
USPC ................................ 348/14.01–14.03, 14.07
See application file for complete search history.

(56) References Cited

U.S. PATENT DOCUMENTS

| | | | |
|---|---|---|---|
| 2005/0134907 A1* | 6/2005 | Obuchi et al. | 358/1.15 |
| 2007/0057866 A1 | 3/2007 | Lee et al. | |
| 2007/0279482 A1* | 12/2007 | Oswald et al. | 348/14.02 |
| 2008/0084482 A1 | 4/2008 | Hansson et al. | |
| 2008/0096534 A1* | 4/2008 | Yoon | G06Q 10/107 455/412.1 |

FOREIGN PATENT DOCUMENTS

| | | |
|---|---|---|
| KR | 10-0672338 B1 | 1/2007 |
| KR | 10-2008-0082821 A | 9/2008 |

\* cited by examiner

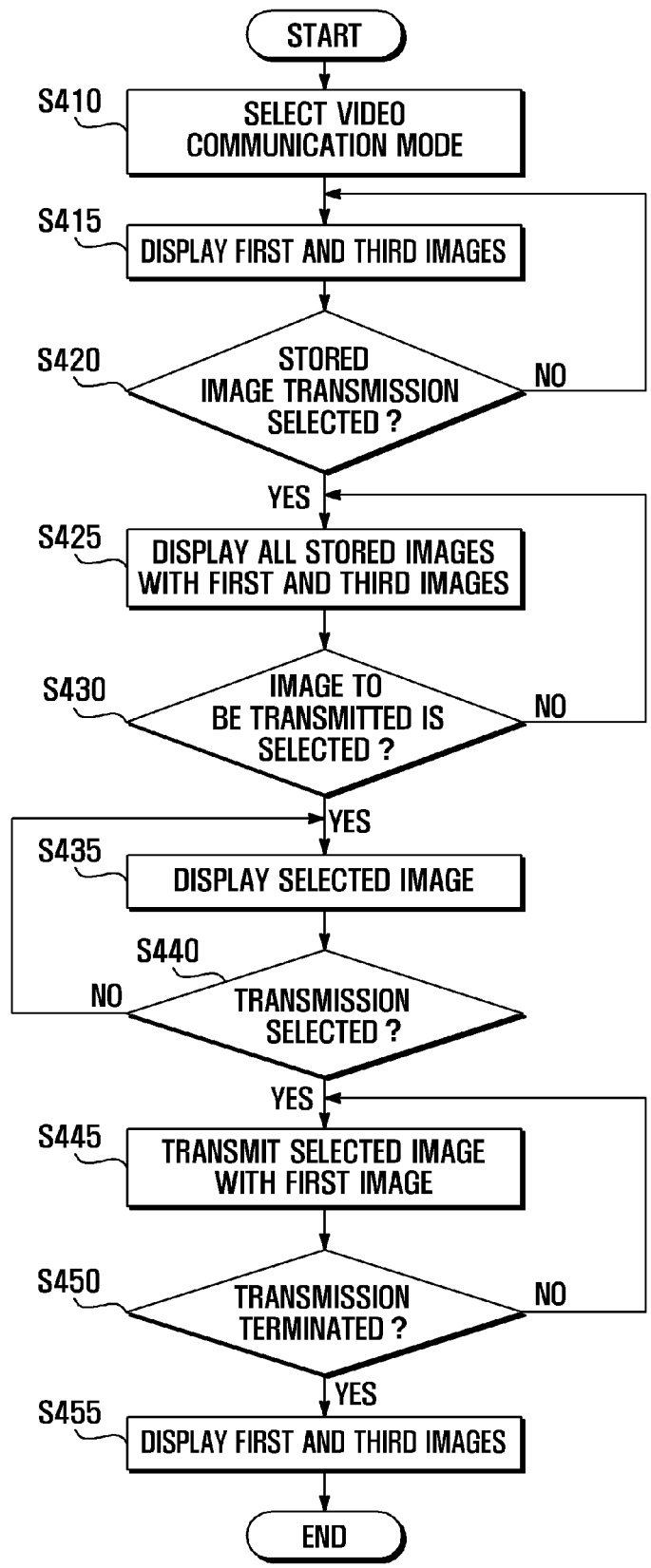

MOBILE TERMINAL AND METHOD FOR TRANSMITTING IMAGE THEREIN

PRIORITY

This application is a continuation application of a prior application Ser. No. 12/243,581, filed on Oct. 1, 2008, which claimed the benefit under 35 U.S.C §119(a) of a Korean patent application filed on Oct. 26, 2007 in the Korean Intellectual Property Office and assigned Serial number 10-2007-0108284, the entire disclosure of which is hereby incorporated by reference

BACKGROUND OF THE INVENTION

1. Field of the Invention

The present invention relates to a mobile terminal and a method for transmitting an image therein. More particularly, the present invention relates to a mobile terminal having at least two camera units for video communication and a method for transmitting an image input through the camera units in the mobile terminal.

2. Description of the Related Art

A mobile terminal has various functions according to various user demands. The functions may include one or more of a communication function, a camera function, an MP3 function, a data transmitting function, a DMB function and the like.

A user can photograph a desired scene using a camera function in a mobile terminal as a moving picture or as a photograph instead of using a digital camera. Thus, a mobile terminal having a camera function has become popular.

Further, a user can perform video communication using the camera function and the communication function. The video communication enables users that are in communication to view each other and their environment.

A conventional mobile terminal for video communication includes two camera units. One camera unit is installed in a front part of the mobile terminal for photographing an image of a user to be transmitted to a person receiving a phone call. The other camera unit is installed at a rear part of the mobile terminal for taking a photograph or a moving picture.

In the conventional mobile terminal, while one camera unit is used for video communication including an image of the user, the other camera unit cannot be used. Accordingly, a user cannot take a photograph or a moving picture of their environment while engaging in video communication. Further, a user cannot share what happens nearby or a photograph that is previously stored with a person receiving the video communication.

SUMMARY OF THE INVENTION

An aspect of the present invention is to address at least the above-mentioned problems and/or disadvantages and to provide at least the advantages described below. Accordingly, an aspect of the present invention is to provide a mobile terminal having at least two camera units for video communication and a method for transmitting images input through the camera units in the mobile terminal.

In an exemplary embodiment of the present invention, a method for transmitting an image in a mobile terminal having at least two camera units is provided. The method includes displaying a first image input through a first camera unit while participating in a video communication, transmitting the first image to a counterpart terminal, operating, if a second image is selected for transmission, a second camera unit, inputting a second image through the second camera unit, resizing the first image and the second image according to an image standard used for the video communication, displaying the resized first image and second image, and transmitting the resized first image and second image to the counterpart terminal.

In another exemplary embodiment of the present invention, a method for transmitting an image in a mobile terminal having at least two camera units is provided. The method includes displaying a first image input through a first camera unit while participating in a video communication, transmitting the first image to a counterpart terminal, receiving a third image from the counterpart terminal, operating, if a second image is selected for transmission, a second camera unit, inputting a second image through the second camera unit, displaying at least one of the first image, the second image and the third image, and transmitting the first image and the second image to the counterpart terminal.

In a further exemplary embodiment of the present invention, a method for transmitting an image is provided. The method includes displaying a first image input through a first camera unit while participating in a video communication, transmitting the first image to a counterpart terminal, resizing, if a stored image is selected for transmission, at least one stored image and the first image, displaying the at least one stored image and the first image, and transmitting the first image and an image selected from the displayed at least one stored image.

In yet another exemplary embodiment of the present invention, a mobile terminal is provided. The terminal includes an input unit for inputting at least one of a video communication command and an image transmission command, a first camera unit for photographing a first image, a second camera unit for photographing a second image according to the at least one of a video communication command and an image transmission command input through the input unit, a controller for transmitting the first image according to the video communication command, and for resizing the first image and the second image according to an image standard used for video communication, for displaying the resized first image and second images, and for transmitting the resized first image and second image to a counterpart terminal according to the image transmission command, a display unit for displaying, under the control of the controller, the first image and the second image, and a wireless communication unit for transmitting, under the control of the controller, the resized first image and second image to the counterpart terminal.

In another exemplary embodiment of the present invention, a mobile terminal is provided. The terminal includes an input unit for inputting at least one of a video communication command and an image transmission command, a first camera unit for photographing a first image, a second camera unit for photographing a second image according to the at least one of a video communication command and an image transmission command input through the input unit, a controller for transmitting the first image according to the video communication command, for transmitting the first image and the second image to a counterpart terminal, and for receiving a third image from the counterpart terminal according to the image transmission command, a display unit for displaying at least one of the first, second and third images under the control of the controller, and a wireless communication unit for transmitting the first image and second image to the counterpart terminal under the control of the controller, and for receiving the third image from the counterpart terminal.

According to exemplary embodiments of the present invention, a user can use a plurality of camera units in a mobile terminal to effectively transmit a photograph or a moving picture photographed through a camera unit to a counterpart terminal during a video communication. In addition, the user can display an image input through a camera unit for the video communication and another image input through another camera unit during the video communication, thereby viewing the image for the video communication and the other image together.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 4 is a flowchart illustrating a method for transmitting a stored image during video communication according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions incorporated are omitted for clarity and conciseness.

In the exemplary embodiments of the present invention described hereinafter, an 'image' refers to all data input through a camera unit in a mobile terminal. The data may include at least one of a moving picture, a still photograph and the like.

Figure 1:
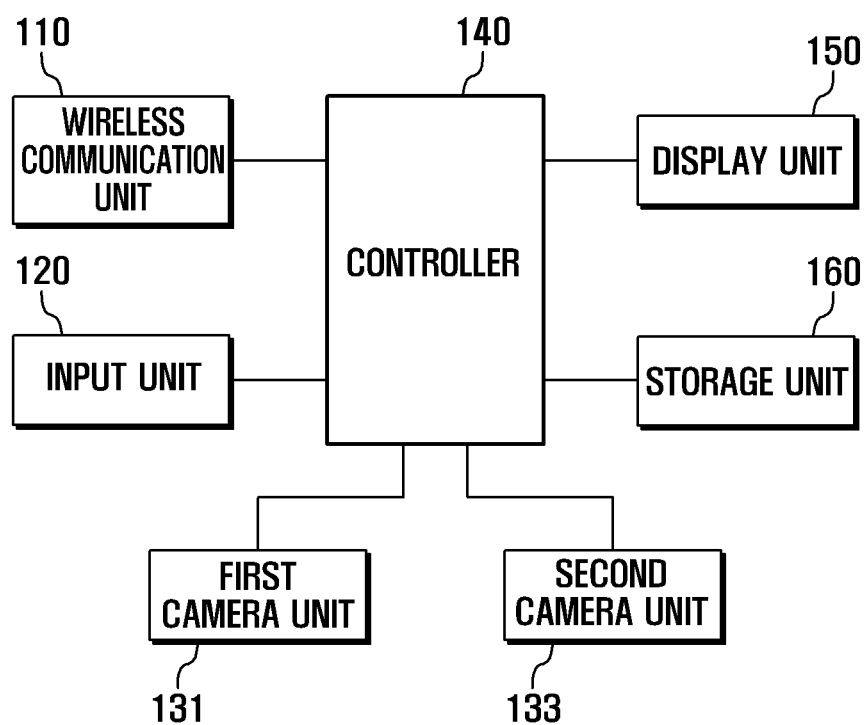
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the mobile terminal includes a wireless communication unit 110, an input unit 120, a first camera unit 131, a second camera unit 133, a controller 140, a display unit 150 and a storage unit 160.

The wireless communication unit 110 performs a communication function between the mobile terminal and a base station. In addition, the wireless communication unit 110 may perform a communication function between the mobile terminal and another mobile terminal, a relay, or any other communications entity. The wireless communication unit 110 transmits and receives data for video communication and transmits and receives image data during video communication under the control of the controller 140. The wireless communication unit 110 may include at least one of a duplexer for separating a transmitting function and a receiving function, a transmitter for up-converting a frequency of a transmission signal, a receiver for down-converting a frequency of a received signal and the like.

The input unit 120 includes at least one of input keys for inputting characters, function keys for setting various functions and the like. The function keys may include at least one of a directional key, a side key, a shortcut key that are set to perform various functions and the like. In particular, the input unit 120 may include a video communication key for performing video communication and the like. The input unit 120 may also include at least one of a function key for taking a moving picture or a photograph (hereinafter, the moving picture and the photograph are referred to as an image) in video communication, a key for transmitting the photographed image to a counterpart terminal participating in the video communication and the like.

Although not shown, the first camera unit 131 and the second camera unit 133 may each include at least one of a camera sensor for converting an optical signal input through a lens into an analog image signal, a signal processor for converting the analog image signal processed from the camera sensor into digital data and the like. The camera sensor may be embodied as a Charged Coupled Device (CCD) sensor, and the signal processor may be embodied as a Digital Signal Processor (DSP). The first camera unit 131 and the second camera unit 133 each may photograph a user image to be transmitted to a counterpart terminal and may photograph an image of a surrounding environment in a video communication mode.

It is assumed that the first camera unit 131 photographs a user image for video communication to be transmitted to a counterpart terminal in video communication and the second camera unit 133 photographs an image of a surrounding environment. Hereinafter, the image input through the first camera unit 131 is referred to as a first image, and the image input through the second camera unit 133 is referred to as a second image. The mobile terminal having two camera units is exemplified in the present invention, however, more than two camera units may be provided according to a design of the mobile terminal.

The controller 140 may control overall operations of the mobile terminal. In particular, the controller 140 may control the wireless communication unit 110 to transmit the first image input through the first camera unit 131 to a counterpart terminal in the video communication mode. When a user selects an image transmission function through the input unit 120 during video communication, the controller 140 may control to display the second image input through the second camera unit 133 with the first image in the display unit 150. The controller 140 may control the wireless communication unit 110 to transmit the second image input through the second camera unit 133 with the first image input through the first camera unit 131 to the counterpart terminal.

Further, the controller 140 may resize the first and second images to be suitable for an image standard for video communication and may transmit the resized first and second images. For example, if a resolution format of the image standard for video communication may be a Quarter Common Intermediate Format (QCIF) resolution format, and the controller 140 may compress the first image into ¼ QCIF and may compress the second image into ½ QCIF, so that the first and second images are resized to be suitable for the image standard for video communication. The controller 140 may then resize resolution of a third image, which is an image of a user of a counterpart terminal participating in the video communication that is transmitted by the counterpart terminal to the mobile terminal, into ¼ QCIF and may display the first, second and third images in the display unit 150. When the controller 140 transmits the resized first and second images to the counterpart terminal, the controller 140 may transmit the first and second images as one image data or may transmit the first and second images as separate image data.

Figure 3:
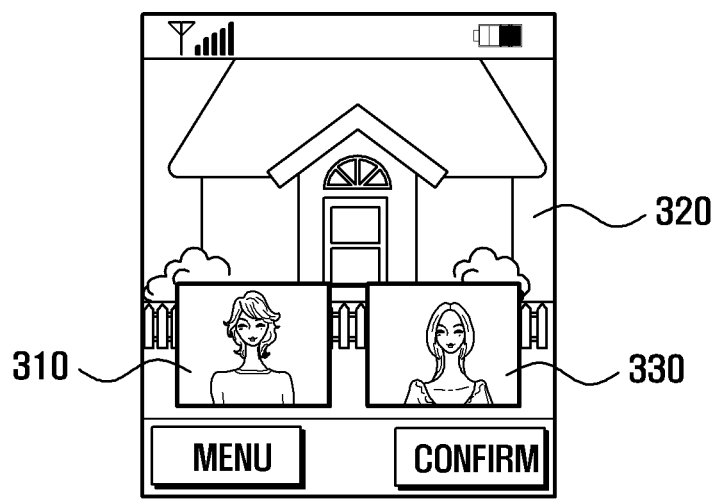
FIG. 3 is an example of a screen for displaying images during image transmission according to an exemplary embodiment of the present invention.

The display unit 150 displays information on operations of the mobile terminal. The display unit 150 may employ a Liquid Crystal Display (LCD), an Organic Light Emitting Diode (OLED) and the like. In this case, the display unit 150 may include an LCD controller, a memory unit for storing image data and an LCD display element. In a case that the LCD is embodied as a touch screen type, the display unit 150 may function as an input unit. As illustrated in FIG. 3 as an example, the display unit 150 may include a first screen 310, a second screen 320 and a third screen 330, and may display, respectively, the first image input through the first camera unit 131, the second image input through the second camera unit 133, and the third image received from the terminal of the counterpart person.

The storage unit 160 may store various programs for controlling operations of the mobile terminal and various data generated in the operations of the mobile terminal. The storage unit 160 may store the first and second images input through the first and second camera units 131 and 133 under the control of the controller 140. The storage unit 160 may store the third image transmitted from the counterpart terminal under the control of the controller 140. Further, the storage unit 160 may store an image, other than the third image, transmitted from the counterpart terminal under the control of the controller 140.

If an image transmission function is selected while in video communication, the controller 140 may transmit the first image input through the first camera unit 131 and the second image input through the second camera unit 133 to the counterpart terminal through the wireless communication unit 110. Here, the controller 140 may resize the first and second images to be suitable for the image standard for video communication. The controller 140 may also control the storage unit 160 to store the second image. If image transmission is selected in video communication, the controller 140 may transmit images stored in the storage unit 160 instead of the second image input through the second camera unit 133. When transmitting an image, the controller 140 may display the transmitted image with the first and third images in the display unit 150.

Hereinafter, a method for transmitting an image in a mobile terminal during video communication is described in detail with reference to FIG. 2.

Figure 2:
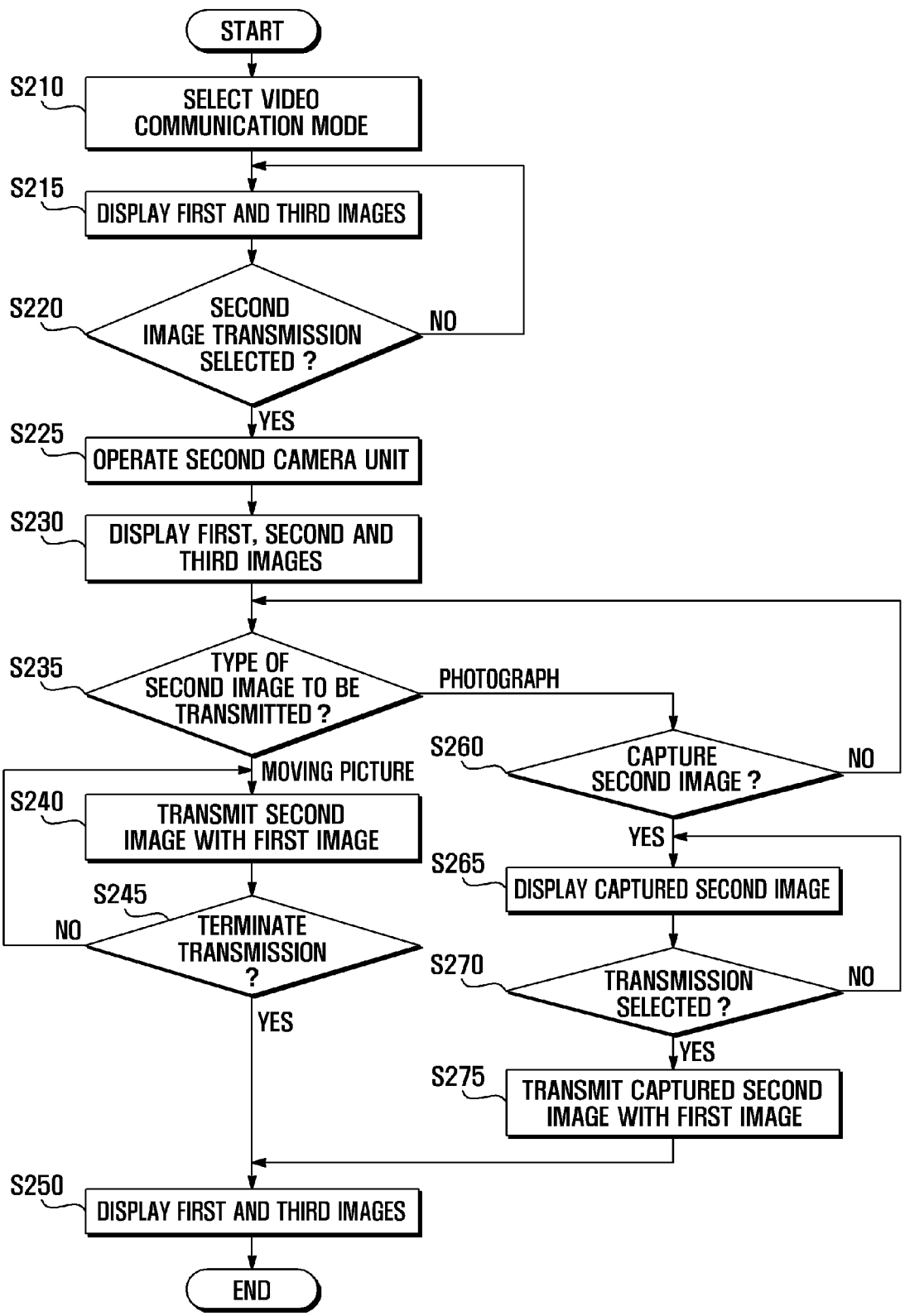
FIG. 2 is a flowchart illustrating a method for transmitting an image in a mobile terminal during video communication according to an exemplary embodiment of the present invention.

FIG. 2 is a flowchart illustrating a method for transmitting an image in a mobile terminal during video communication according to an exemplary embodiment of the present invention. FIG. 3 is an example of a screen for displaying images during image transmission according to an exemplary embodiment of the present invention.

Referring to FIG. 2, a user may input a phone number of a counterpart terminal to participate in a video communication through numeric keys in the input unit 120 and then may input the video communication key. The controller 140 may detect the key input as a video communication command and converts a mode of the mobile terminal into a video communication mode in step S210. Alternatively, a request for participation in the video communication may be received through the wireless communication unit 110 and may be accepted, such as by an input from the user through the input unit 120 and the like. Next, the controller 140 may control the wireless communication unit 110 to perform video communication with the counterpart terminal in step S215. The controller 140 may operate the first camera unit 131 to display a first image input through the first camera unit 131 in the display unit 150. During video communication, the controller 140 may transmit the first image input through the first camera unit 131 to the counterpart terminal through the wireless communication unit 110.

The controller 140 may display the first image transmitted to the counterpart terminal on the first screen 310 of the display unit 150 and may display the third image of the user of the counterpart terminal received from the counterpart terminal on the third screen 330 of the display unit 150. The sizes and positions of the desired first and third images may differ according to user or other settings. Further, the controller 140 may resize the first image and the third image to be suitable for the set size of the screen for display.

Then, the controller 140 may determine whether second image transmission is selected in step S220. The user may select, during video communication, second image transmission through at least one of a function key, a menu in the input unit 120 and the like. If the user does not select second image transmission, the process returns to step S215. If the user selects second image transmission, the controller 140 may operate the second camera unit 133 in step S225.

The controller 140 may display the second image input through the second camera unit 133 in step S230. The controller 140 may control the display unit 150 to display the second image on the second screen 320 while displaying the first image on the first screen 310 and the third image on the third screen 330.

The first, second and third images can be displayed on a screen that is divided into the first, second and third screens 310 to 330, as illustrated in FIG. 3. Referring to FIG. 3, the first image is displayed on the first screen 310, the second image on the second screen 320 and the third image on the third screen 330. Further, according to a screen dividing method, image allocation to the divided screens and the sizes and positions of the screens may vary according to at least one of user settings, manufacture settings and the like. The images to be displayed on the three screens may be exchanged with each other according to a user selection. Further, if the second screen 320 is a main screen and the first and third screens 310 and 330 are sub-screens, as illustrated in FIG. 3, the image displayed on the main screen may be exchanged with any one of the images displayed on the sub-screens by the user's selection. For example, if a user selects the first screen 310 using at least one of a directional key, a touch on a touch screen, a menu and the like, and then selects the second screen 320, the controller 140 may control to replace the first image displayed on the first screen 310 with the second image, and to replace the second image displayed on the second screen 320 with the first image. Similarly, the controller 140 may control to display any one of the images displayed on the other screens on the third screen 330 in place of the third image according to the user's selection.

The controller 140 may resize the first, second and third images to be suitable for the image standard for video communication. For example, the controller 140 may resize the first image into ¼ QCIF, the second image into ½ QCIF, and the third image into ¼ QCIF, so that the first, second and third images are displayed together.

Then, the controller 140 may determine the type of the second image to be transmitted in step S235. That is, the controller 140 may determine whether the type of the second image to be transmitted is a moving picture or a photograph. If the moving picture is selected, the controller 140 may transmit the second image, that is, a moving picture input through the second camera unit 133, with the first image to the counterpart terminal in step S240. Here, the controller 140 may control the sizes of the first and second images to be suitable for the image standard for video communication to the counterpart terminal. Accordingly, the user can take a moving picture of their environment or of a nearby incident through the second camera unit 133 in the mobile terminal as a second image. The second image can be transmitted to the counterpart terminal in real time.

The controller 140 may determine whether transmission of the second image is to be terminated in step S245. If the user inputs a function key, for example a confirmation key, in the input unit 120 to terminate the second image photographing, the controller 140 may detect the key input as an instruction to terminate moving picture transmission. The controller 140 may then delete the second screen 320 on which the second image is displayed, and may display only the first and third screens 310 and 330 on which the first and third images are displayed in step S250. The controller 140 may store the transmitted second image in the storage unit 160 according to at least one of the user's selection, a setting and the like.

If the user selects photograph transmission at step S235, the controller 140 may determine whether the user inputs a photographing key in the input unit 120 to capture the second image as a photograph in step S260. If the user does not input a photographing key in the input unit 120, the process returns to step S235. If the user inputs a photographing key in the input unit 120, the controller 140 may capture the second image as a photograph and may display the captured second image on the second screen 320 of the display unit 150 in step S265. The controller 140 may control the display unit 150 to continue displaying the first screen 310 and the third screen 330 on which the first and third images are displayed with the second screen 320.

Next, the controller 140 may determine whether transmission of the captured image is selected in step S270. The user may select the captured image transmission through at least one of a function key, a menu and the like in the input unit 120. If transmission of the captured image is not selected, the process returns to step S265. If transmission of the captured image is selected, the controller 140 may transmit the captured second image with the first image to the counterpart terminal in step S275. The controller 140 may resize the first and second images to be suitable for the image standard for video communication for transmission. The controller 140 may store the captured second image in the storage unit 160 according to at least one of the user's selection, a setting and the like.

After transmission of the captured second image, the controller 140 may delete the second screen 320 on which the second image is displayed and may display the first and third screens 310 and 330 on which the first and third images are displayed in step S250.

Hereinafter, a method for displaying an image stored in a mobile terminal in video communication and for transmitting the displayed image to a counterpart terminal is described in detail.

FIG. 4 is a flowchart illustrating a method for transmitting a stored image during video communication according to an exemplary embodiment of the present invention.

Referring to FIG. 4, a user may input a phone number of a counterpart terminal to participate in a video communication through numeric keys in the input unit 120 and then may input a video communication key. The controller 140 may detect the key input as a video communication command and may convert a mode of the mobile terminal into a video communication mode in step S410. Alternatively, a request for participation in the video communication may be received through the wireless communication unit 110 and may be accepted, such as by an input from the user through the input unit 120 and the like. Next, the controller 140 may control the wireless communication unit 110 to perform video communication with the counterpart terminal in step S415. The controller 140 may operate the first camera unit 131 to display a first image input through the first camera unit 131 in the display unit 150. During video communication, the controller 140 may transmit the first image input through the first camera unit 131 to the counterpart terminal through the wireless communication unit 110.

The controller 140 may display the first image transmitted to the counterpart terminal on the first screen 310 of the display unit 150 and may display the third image of the user of the counterpart terminal received from the counterpart terminal on the third screen 330 of the display unit 150. The sizes and positions of the displayed first and third images may differ according to user or other settings.

Next, the controller 140 may determine whether stored image transmission is selected in step S420. The user may select, during video communication, the stored image transmission through at least one of a function key, a menu in the input unit 120 and the like. If the user does not select stored image transmission, the process returns to step S415. If the user selects the stored image transmission, the controller 140 may display all images stored in the storage unit 160 on the second screen 320 in step S425. The stored images may be displayed in at least one of a moving sequence manner, as thumbnail images on the second screen 320 and the like. The controller 140 may control the display unit 150 to display the stored images on the second screen 320 while displaying the first image on the first screen 310 and the third image on the third screen 330.

The controller 140 may determine whether the user selects an image to be transmitted from the displayed stored images through the input unit 120 in step S430. If the user does not select an image to be transmitted, the process returns to step S425. If the user selects an image to be transmitted, the controller 140 may display the selected image on the second screen 320 in step S435. Next, the controller 140 may determine whether transmission of the selected image is selected in step S440. If the user does not select image transmission, the process returns to step S435. If the user selects image transmission, the controller 140 may transmit the selected image with the first image to the counterpart terminal in step S445. The controller 140 may determine the sizes of the first image and the selected image and may resize the first image and the selected image to be suitable for video communication for transmission.

The controller 140 may determines whether the image transmission is to be terminated in step S450. When the transmission is terminated, the controller 140 may delete the second screen 320 on which the selected image is displayed, and may display only the first and third screens 310 and 330 on which the first and third images are displayed in step S455. If the transmission is not terminated, the process returns to step S445.

Although not shown, if an image is received from a counterpart terminal in addition to the third image of the user of the counterpart terminal participating in the video communication, the controller 140 may display the additional received image in the display unit 150 together with the third image. That is, the controller 140 may display the first image input through the first camera unit 131 and transmitted to the counterpart terminal on the first screen 130, the additional image received from the counterpart terminal on the second screen 320, and the third image of the user of the counterpart terminal on the third screen 330. The controller 140 may resize the images displayed on the first screen 310, second screen 320 and third screen 330 to be suitable for the image standard for video communication.

Further, in a case the mobile terminal and the counterpart terminal transmit and receive images at the same time in video communication, the controller 140 may divide the screen of the display unit 150 into four screen areas and may display the image received from the counterpart terminal and the image transmitted from the mobile terminal, in addition to the images of the user of the mobile terminal and the user of the counterpart terminal, in the four screen areas.

While the present invention has been described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method comprising:
   determining that a video communication mode is selected;
   obtaining, at an electronic device including a first camera and a second camera, a first image, the first image captured via the first camera;
   determining that transmission of a second image is selected;
   obtaining a second image, the second image captured via the second camera;
   resizing the first image to have a first resolution and the second image to have a second resolution higher than the first resolution;
   presenting the resized first image on a first portion of a display operatively coupled with the electronic device, and the resized second image on a second portion of the display;
   determining whether a type of the second image is a moving picture or a photograph;
   transmitting the resized first image with the resized second image to a counterpart terminal if the type of the second image is the photograph;
   displaying an additional third image received from another electronic device; and
   deleting the second image presented on the second portion.

2. The method of claim 1, further comprising:
   displaying all images stored in the electronic device on the display if user selection on a stored image transmission is detected.

3. The method of claim 2, wherein each of the resized first and second images is to be obtained as part of a video communication.

4. The method of claim 2, wherein the first image comprises an image of a user of the electronic device, and the third image comprises an image of a user of the other electronic device.

5. The method of claim 1, further comprising:
   displaying an additional image received from the counterpart terminal on a fourth portion of the display.

6. The method of claim 5, wherein the resized first and second images are transmitted as separate image data.

7. The method of claim 5, further comprising:
   terminating transmission of the resized second image based at least in part on a user input for termination.

8. The method of claim 1, further comprising:
   adjusting sizes or positions of the resized first image or the resized second image based on a user input.

9. The method of claim 1, further comprising:
   switching the resized first image and the resized second image based on a user input.

10. An apparatus comprising:
    a first camera configured to capture a first image having a first resolution;
    a second camera configured to capture a second image;
    a display having a first portion and a second portion; and
    a controller operatively coupled with the display, the controller configured to:
      determine that a video communication mode is selected,
      obtain the first image via the first camera,
      determine that transmission of a second image is selected,
      obtain the second image via the second camera,
      resize the first image to have a first resolution and the second image to have a second resolution higher than the first resolution,
      display the resized first image on the first portion of the display, and the resized second image on the second portion of the display,
      determine whether a type of the second image is a moving picture or a photograph,
      transmit the resized first image with the resized second image to a counterpart terminal if the type of the second image is the photograph,
      display an additional third image received from another electronic device on the display if user selection of a stored image transmission is detected, and
      delete the second image presented on the second portion.

11. The apparatus of claim 10, wherein the controller is further configured to:
    display all images stored in the electronic device on the display if the user selection of the stored image transmission is detected.

12. The apparatus of claim 11, wherein each of the resized first and second images is to be obtained as part of a video communication.

13. The apparatus of claim 11, wherein the first image comprises an image of a user of the apparatus, and the third image comprises an image of a user of the electronic device.

14. The apparatus of claim 11,
    wherein the display includes a third portion, and
    wherein the third portion includes the first portion or the second portion.

15. The apparatus of claim 10, wherein the controller is further configured to display an additional image received from the counterpart terminal on a fourth portion of the display.

16. The apparatus of claim 10, wherein sizes or positions of the resized first image or the resized second image are adjustable based on a user input.

17. The apparatus of claim 10, wherein the controller is further configured to:
switch the resized first image and the resized second image based on a user input.

18. The apparatus of claim 10, wherein the first camera is placed on an opposite side of the apparatus on which the second camera is placed.

19. A non-transitory machine-readable storage device storing instructions that, when executed by one or more processors, cause the one or more processors to perform operations comprising:
determining that a video communication mode is selected;
obtaining, at an electronic device including a first camera and a second camera, a first image, the first image captured via the first camera;
determining that transmission of a second image is selected;
obtaining a second image, the second image captured via the second camera;
resizing the first image to have a first resolution and the second image to have a second resolution higher than the first resolution;
presenting the resized first image on a first portion of a display operatively coupled with the electronic device, and the resized second image on a second portion of the display;
determining whether a type of the second image is a moving picture or a photograph;
transmitting the resized first image with the resized second image to a counterpart terminal if the type of the second image is the photograph;
displaying an additional third image received from another electronic device; and
deleting the second image presented on the first portion.

* * * * *